3,847,965
PROCESS FOR PREPARING ACRYLONITRILE BY THE AMMOXIDATION OF PROPYLENE USING A METAL OXIDE COMPOSITION OF ANTIMONY-TIN-COPPER-IRON AND AN ADDITIONAL METAL
Edward James Gasson, Dollar, Stanley Frederic Marrian, Aberdour, and Thomas Charles Krosnar, Polmont, Scotland, assignors to BP Chemicals International Limited, London, England
No Drawing. Filed Mar. 12, 1973, Ser. No. 339,999
Claims priority, application Great Britain, Mar. 17, 1972, 12,607/72
Int. Cl. C07c *121/02*
U.S. Cl. 260—465.3        10 Claims

ABSTRACT OF THE DISCLOSURE

A process for preparing acrylonitrile by the vapor phase reaction at elevated temperatures of propylene, ammonia, and molecular oxygen in the presence of a catalyst essentially consisting of an oxide composition of antimony, tin, copper, iron and an additional metal selected from the group consisting of beryllium, magnesium, calcium, zinc, strontium, cadmium, and barium.

---

The present invention relates to the production of unsaturated nitriles and in particular to the production of acrylonitrile.

Processes for the production of acrylonitrile by the vapour phase catalytic reaction of propylene, molecular oxygen and ammonia are known. The catalyst for use in such processes in general comprises compositions containing one or more polyvalent metals suitably compounded in the form of oxides. Thus, for example, British Patent Specification No. 876,446 (The Distillers Company Limited) described a catalyst suitable for use in catalysing vapour phase catalytic reaction of propylene, molecular oxygen and ammonia, which catalyst comprises an oxide composition containing antimony and tin, and British Patent Specification No. 1,033,829 (The Distillers Company Limited) describes the addition of polyvalent metal oxides, e.g. copper, to the aforementioned compositions, which gives a substantial improvement in catalyst performance.

It is known that no further catalyst improvement results from increasing the quantity of such polyvalent metals beyond the levels disclosed in the above prior patent, but it has surprisingly been found that some further improvements in the catalyst performance can be obtained by adding a different type of metal, which is not necessarily polyvalent. The term "polyvalent" is meant to indicate that the metal forms more than one oxide or more than one series of salts. Such oxides are for example, those of the metals of Group II of the Periodic Table according to Mendeleef, in particular the oxides of magnesium or zinc.

The precise mode of action of these new additives is not known, although it is thought that they modify the semiconductor substrate of the catalyst. These additives improve the catalyst in two ways, (a) by increasing the maximum acrylonitrile yield obtainable from propylene and (b) by lowering the optimum operating temperature of the catalyst. Each of these effects represents a significant economic advantage in commercial operation.

Accordingly, the present invention is a process for the production of acrylonitrile which comprises reacting at an elevated temperature in the vapour phase propylene, molecular oxygen and ammonia over a catalyst which is an oxide composition comprising antimony, tin, copper and/or iron with, in addition, one or more of the metals beryllium, magnesium, calcium, zinc, strontium, cadmium, barium.

The preferred catalyst is an oxide composition comprising antimony, tin, copper and/or iron together with magnesium and/or zinc.

The oxide composition catalysts of the present invention may be regarded either as mixtures of the oxides of the various metal components or as oxygen-containing compounds of such metals; under the reaction conditions either or both forms may be present.

The catalyst may be prepared for instance by intimately mixing the oxides or compounds yielding the oxides on heating, or coprecipitation of the oxides, hydrated oxides or insoluble salts from an aqueous solution.

The proportions of the various components may vary within a moderately wide range. Thus, for example, suitable proportions are antimony to tin in atomic ratio in the range 2:1 to 10:1 with the amount of copper and/or iron in the range from 0.5% to 30% molar of the total composition, and the amount of other additive metal being such that the atomic ratio antimony to such metals is in the range of 3 to 16.

It is preferred to give the catalyst a prior heat-treatment, for instance at a temperature beween 550 and 1100° C. in a molecular oxygen-containing gas.

The reaction of propylene with oxygen and ammonia over the catalysts may be carried out in any suitable manner, for instance as a fixed bed process in which the catalyst is used in the form of granules or pellets, or as a fluidised bed process, or as a moving bed process.

The proportion of propylene in the feed to the reaction may vary within fairly wide limits, for example, between 1 and 20% by volume of the feed, and suitably between 2 and 10% by volume.

It is preferred to use between 5 and 8% by volume of propylene in the feed.

The concentration of oxygen in the feed may also vary within moderately wide limts, for example, between 1 and 20% by volume. The oxygen may be diluted with inert gases, and may be for example, supplied as air.

The reaction is suitably carried out in the presence, as diluent, of a gas which is substantially inert under the conditions of reaction, for example, nitrogen, propane, butane, isobutane, carbon dioxide and steam. It is preferred to carry out the reaction in the presence of steam or mixtures of steam and nitrogen. The concentration of the steam may vary within wide limits, for instance between zero and 60% by volume of the feed.

The concentration of ammonia may also vary within moderately wide limits, for instance, between 2 and 10% by volume of the feed. If the maximum yield of acrylonitrile on propylene is required, it is desirable to use an excess of ammonia over propylene. For instance, the preferred concentration of ammonia is about 5–6% by volume of the feed where this contains 5% of propylene.

The reaction is carried out at an elevated temperature preferably below 550° C., e.g. between 350° C. and 500° C.

The contact time, defined as the volume of catalyst divided by the flow of gas per second calculated at room temperature and pressure, may be, for example, in the range 1–30 seconds.

The reaction may be carried out at atmospheric pressure, or at super- or sub-atmospheric pressures. It is preferred to operate at a pressure of 1 to 5 atmosphere absolute.

The acrylonitrile may be recovered from the reaction products in any suitable manner, for example, by extraction with water, preferably at an acid pH, followed by fractional distillation. In one method the hot reaction gases are contacted firstly with a hot aqueous solution of sulphuric acid and ammonium sulphate which neutralises excess ammonia, and secondly with cold water to extract the nitrile; the nitrile is subsequently recovered from the extract by fractional distillation.

The process of the present invention is described in more detail with reference to the following examples.

EXAMPLE 1

Catalyst Preparation (a) Catalyst 1: Sb/Sn/Cu/Fe—3/1/0.25/0.25.

This in a typical known catalyst.

Antimony trioxide (2190 parts by weight) was added to a stirred mixture of 70% nitric acid (2630 parts by weight) and water (7,500 parts by weight) which had been heated to 110° C., and powdered tin (593 parts by weight) was added at 100° C. over 15 minutes. The mixture was cooled to 40° and filtered. The cake was re-suspended in water (6,500 parts by weight) and solutions of $Cu(NO_3)_2 \cdot 3H_2O$ (303 parts by weight) in water (1000 parts by weight), and $Fe(NO_3)_3 \cdot 9H_2O$ (507 parts by weight) in water (1000 parts by weight), were added. The mixture was heated to 50° and neutralised with aqueous ammonia solution, which had been prepared by diluting 0.88 ammonia with three volumes of water, to pH 6.4. The slurry was stirred at 50° for 15 minutes, and the pH was kept at 6.4. The mixture was cooled to room temperature and filtered. The cake was re-suspended in water (10,000 parts by weight) and stirred at room temperature for 30 minutes. The mixture was filtered and dried at 120° C. until 15–20% of water remained in the cake. It was passed through a coarse sieve (5 mesh), granulated, and dried at 120°. It was sieved (22 mesh) and pelleted to cylinders of 4 mm. diameter and 4 mm. length. The pellets were heat-treated in a furnace, in which the temperature was raised by 22° C. per hour, and in which an air stream was injected at a rate of 50 l./hr./kg. catalyst. When the temperature reached 850° C., the catalyst was maintained at that temperature for 16 hours and then cooled.

(b) Catalyst 2: Sb/Sn/Cu/Fe/Mg=3/1/0.25/0.25/0.25.

This catalyst, according to the invention, was prepared in the same way as catalyst 1, except that magnesium hydroxide was added with stirring at the end of the wet-stage procedure, when the filter cake was finally re-suspended for water washing. The magnesium hydroxide was precipitated from a solution of $Mg(NO_3)_2 \cdot 6H_2O$ (321.5 parts by weight) in water (1000 parts by weight) with diluted ammonia at pH 9.9–10.1 at room temperature; and was washed free of contaminants by re-suspending twice in water after filtration.

(c) Catalyst 3: Sb/Sn/Cu/Fe/Zn=3/1/0.25/0.25/0.25.

This catalyst, according to the invention, was prepared similarly to catalyst 2 except that $Zn(NO_3)_2 \cdot 6H_2O$ (373 parts by weight) was used instead of magnesium nitrate, and the zinc hydroxide was precipitated at pH 7.5–8.0.

(d) Catalysts 4, 5 and 6 which were similar to catalysts 1, 2 and 3 respectively, except that they contained 0.5 atomic proportions of copper, were prepared by the same general method. Catalyst 4 is a known catalyst of slightly different composition to Catalyst 1.

EXAMPLE 2

Catalyst Evaluation

Catalysts 1, 2, 3, 4, 5, and 6 were tested in a tubular reactor consisting of a steel tube 10 feet long and 1 inch internal diameter, which was immersed in a bath of molten heat-transfer salt. The products obtained from the different catalysts aree shown in Tables 1 and 2.

TABLE 1

Feed composition: Propylene/ammonia/air/steam rates=6/6/65/23 by volume. Reactor pressure 15.5 p.s.i.g.

| Number | Catalyst composition | | | | | | Contact time, secs. | Yields (percent) on propylene fed, at optimum bath temperatures | | | | | | Salt bath temp., °C. |
|---|---|---|---|---|---|---|---|---|---|---|---|---|---|---|
| | Sb | Sn | Cu | Fe | Mg | Zn | | AN | ACO | HCN | $CO_2$ | CO | Rec'd $C_3H_6$ | |
| 1 | 3 | 1 | 0.25 | 0.25 | | | 4 | 61.2 | 2.4 | 6.2 | 9.2 | 4.7 | 11.1 | 455 |
| 2 | 3 | 1 | 0.25 | 0.25 | 0.25 | | 4 | 64.2 | 1.5 | 6.3 | 12.9 | 5.7 | 6.1 | 455 |
| 3 | 3 | 1 | 0.25 | 0.25 | | 0.25 | 4 | 64.1 | 1.9 | 6.6 | 10.5 | 5.0 | 7.4 | 455 |

TABLE 2

Feed composition: Propylene/ammonia/air/steam rates=6/6/65/23 by volume. Reactor pressure 15.5 p.s.i.g.

| Number | Catalyst composition | | | | | | Contact time, secs. | Yields (percent) on propylene fed, at optimum bath temperatures | | | | | | Salt bath temp., °C. |
|---|---|---|---|---|---|---|---|---|---|---|---|---|---|---|
| | Sb | Sn | Cu | Fe | Mg | Zn | | AN | ACO | HCN | $CO_2$ | CO | Rec'd $C_3H_6$ | |
| 4 | 3 | 1 | 0.5 | 0.25 | | | 4 | 60.2 | 2.0 | 6.5 | 8.5 | 4.8 | 10.3 | 465 |
| 5 | 3 | 1 | 0.5 | 0.25 | 0.25 | | 4 | 62.0 | 1.6 | 6.8 | 13.8 | 5.8 | 4.4 | 465 |
| 6 | 3 | 1 | 0.5 | 0.25 | | 0.25 | 4 | 62.0 | 2.1 | 6.4 | 9.4 | 4.1 | 8.9 | 455 |

We claim:

1. A process for the production of acrylonitrile which comprises reacting at an elevated temperature in the vapor phase, propylene, molecular oxygen and ammonia over a catalyst which is an oxide composition essentially consisting of antimony, tin, copper, iron and an additional metal selected from the group consisting of beryllium, magnesium, calcium, zinc, strontium, cadmium, and barium, said catalyst having been heat treated, before use, at a temperature between 550° and 1100° C. in a molecular oxygen-containing gas.

2. A process as claimed in claim 1 wherein said additional metal is magnesium.

3. A process as claimed in claim 1 wherein said additional metal is zinc.

4. A process as claimed in claim 1 wherein the atomic ratio of antimony to tin in the oxide composition is in the range 2:1 to 10:1.

5. A process as claimed in claim 1 wherein the amount of copper and iron in the oxide composition is in the range 0.5% to 30% molar of the total composition.

6. A process as claimed in claim 1 wherein the amount of additional metal is such that the atomic ratio of antimony to such additional metal is in the range 3 to 16.

7. A process as claimed in claim 1 wherein the proportion of propylene in the reactant feed is between 1 and 20% by volume.

8. A process as claimed in claim 1 wherein the proportion of oxygen in the reactant feed is between 1 and 20% by volume.

9. A process as claimed in claim 1 wherein the proportion of ammonia in the reactant feed is between 2 and 10% by volume.

10. A process as claimed in claim 1 wherein the reaction temperature is between 350° and 500° C.

References Cited

UNITED STATES PATENTS

| 3,152,170 | 10/1964 | Barclay et al. | 260—465.3 |
| 3,338,952 | 8/1967 | Callahan et al. | 260—465.3 |
| 3,625,867 | 12/1971 | Yoshino et al. | 260—465.3 X |

JOSEPH P. BRUST, Primary Examiner